Dec. 3, 1963 J. R. DEER 3,112,951
SAFETY DOOR PANELS

Filed July 6, 1962 2 Sheets-Sheet 1

INVENTOR.
JAMES R. DEER
BY
*William J. Ruano*
his ATTORNEY

Dec. 3, 1963  J. R. DEER  3,112,951
SAFETY DOOR PANELS
Filed July 6, 1962  2 Sheets-Sheet 2

INVENTOR.
JAMES R. DEER
BY
William J. Ruano
his ATTORNEY

United States Patent Office 3,112,951
Patented Dec. 3, 1963

3,112,951
SAFETY DOOR PANELS
James R. Deer, 105 Mayer Drive, Pittsburgh 37, Pa.
Filed July 6, 1962, Ser. No. 208,066
2 Claims. (Cl. 296—44)

This invention relates to a safety device for automobiles to prevent opening of doors or windows and falling out thereof by small children, also for adding to their comfort.

Parents of small children have always been concerned about the safety of children seated in the rear seat of a four door automobile. The danger of the door accidentally opening, or intentional opening by inquisitive children, and the danger of opening of the windows too far for safety, have always been matters of great concern for parents.

Numerous accidents from falling out of automobile doors or windows by small children have been reported.

An object of this invention is to overcome the above-mentioned dangers by providing novel safety door panels for installation alongside the rear doors of an automobile, which panels are so constructed as to prevent turning of the door handle or cranking of a window handle by children while the automobile is moving.

A further object of the invention is to provide a floor covering panel for levelling with the rear seat to prevent accidental falling on the floor in case of sudden stops and also provides a sleeping area for children.

Other objects and advantages will become more apparent from a study of the following description taken with the accompanying drawing wherein.

Figure 1:
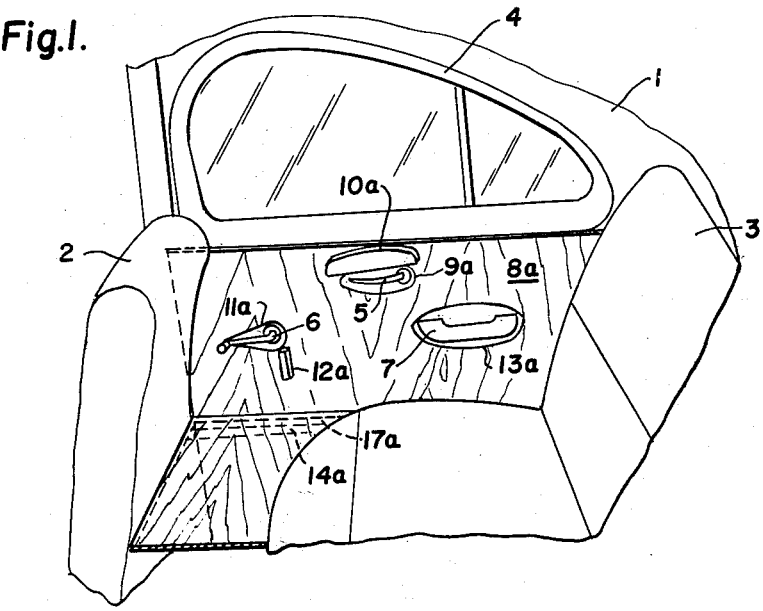
FIG. 1 is a fragmentary, perspective view of the rear seat and interior portion of a four door automobile showing a safety door panel and a portion of a floor covering panel installed therein and embodying the principles of the present invention.
Figure 2:
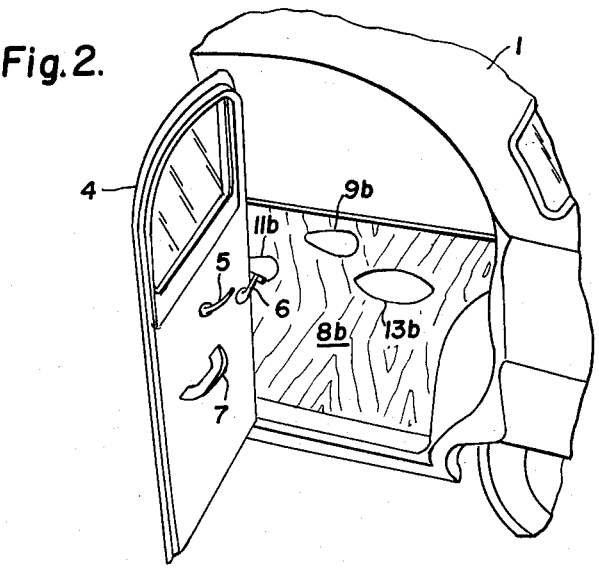
FIG. 2 is a fragmentary, perspective view showing the rear door opened and the safety door panel installed.
Figure 3:
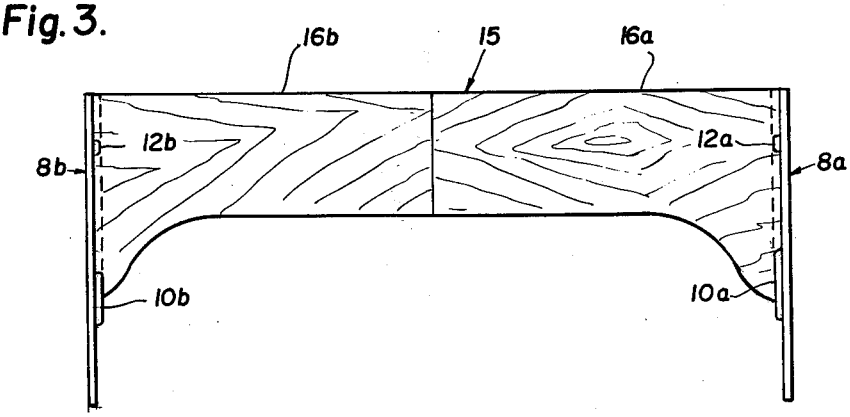
FIG. 3 is a top, or plan view of the bridging floor covering panel supported by the safety door panels.
Figure 4:
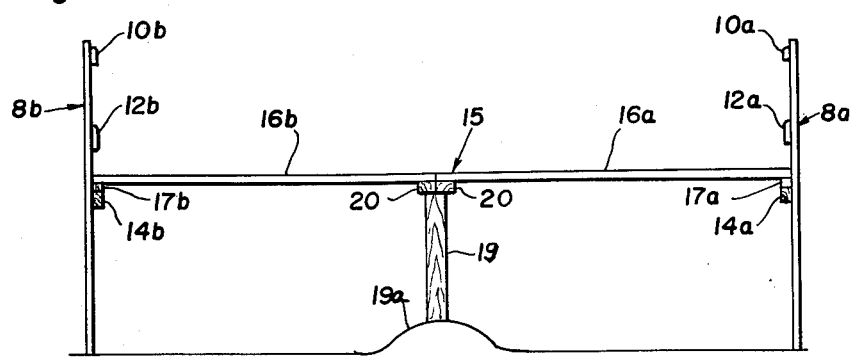
FIG. 4 is a vertical, cross-sectional view of the assembly shown in FIG. 3.
Figure 6:
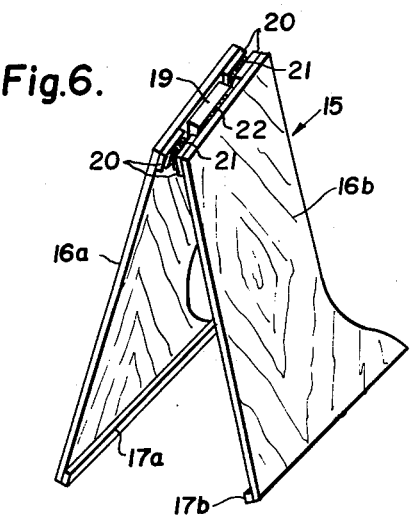
Figure 5:
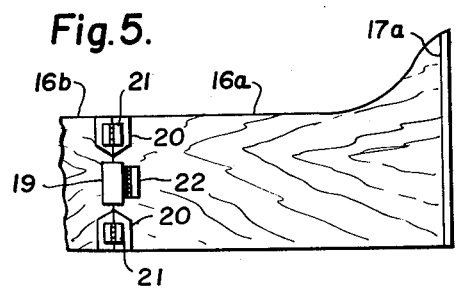
FIG. 5 is a fragmentary, bottom view of a portion of the floor covering panel shown in FIGS. 3 and 4; and, FIG. 6 is a perspective view of the floor covering panel shown in FIGS. 3, 4 and 5.

Referring more particularly to FIGS. 1 and 2 of the drawing, numeral 1 denotes a fragmentary rear portion of the body of a four door automobile having a front seat 2, a rear seat 3, and rear doors 4. On the rear doors 4 are mounted conventional door opening handle 5 and window opening handle 6 and elbow support 7. Handles 5 and 6 are of the crank type for rotation in a clockwise or counterclockwise direction.

In accordance with the present invention, in order to make it impossible for small children, sitting in the rear seat of the car, to turn either handle 5 or handle 6, there is provided a pair of safety door panels 8a and 8b, one for mounting alongside each of the rear doors, and having cut-out portions 9a and 9b for encircling the handles 5, cut-out portions 11a and 11b for encircling the window crank handle 6, and cut-out portions 13a and 13b for encircling the arms rests 7. Immediately adjacent each of the cut-out portions 9a and 9b there is rigidly secured a stop block, such as 10a, for preventing turning of the handle 5 and opening of the door. Likewise adjacent each of the cut-out portions 11a and 11b are mounted stop blocks, such as 12a, to serve as limit stops for preventing turning of window operating handles 6 and opening of the windows.

In operation, each of the panels is installed by sliding the forward edge of the panel forwardly between the door post and front seat, then slightly rearwardly sufficiently so as to insert the rear edges of the panel between the rear seat 3 and car body, thus securing the safety door panels in a position so that they will not be allowed to move either laterally outwardly or inwardly. With the safety panels installed in this position, if the rear door of an automobile should accidentally open, they will act as shields or barriers to prevent children from falling out of the automobile. Therefore, once the safety door panels are in place and the doors closed by allowing the arm rest 7, window operating handle 6 and door operating handle 5 to be inserted through their respective cut-outs in the safety panels 8a and 8b, the children will be secure inside since neither the doors nor the windows can be opened because of the stop blocks 10a and 12a mounted near these handles. If it is preferred that the window be opened partially, this can be done by opening the door and turning handle 6 to move the window down to the desired depth and then aligning the handle 6 with its cut-out 11a or 11b.

FIGS. 3 to 6 inclusive show an additional reinforcing and floor covering platform 15 comprising panels 16a and 16b which are hinged together by hinges 21 secured to hinge blocks 20. The end portions of panel portions 16a and 16b have secured thereunder strips 17a and 17b which are adapted to rest on strips 14a and 14b rigidly secured to the door safety panels 8a and 8b. A center post 19 hinged at 22 and having the same thickness as blocks 20 and strips 17a and 17b, rests upon hump 19a in the floor of the automobile and serves to support the platform 15. The platform 15 is cut out so as to fit snugly about the perimeter of the rear seat and to fill the space between the front and rear seats. It is disposed at a level substantially flush with the rear seat so as to form a continuation thereof and serves to provide a large play or sleeping area for the children and at the same time prevent the children from falling onto the floor as a consequence of a sudden stop of the automobile. Furthermore, platform 15 provides a storage space underneath for safely storing articles during extended trips without serving as obstacles for tripping the children.

The door safety panels 8a and 8b, as well as the floor covering platform 15, may be easily stored in the trunk of the automobile when not needed. In some instances the floor covering platform 15 may be omitted, in which event reliance would be made solely on the protection afforded by the safety door panels.

Panels 8a and 8b may be made of plastic material in which event outward bulges made adjacent the perimeter of cut-out 9a, 9b, 11a and 11b may serve in the place of stop blocks 10a, 12a, etc. to prevent turning of the door or window handles. The panels and platform are very inexpensive and can be made to fit any four door automobile.

Thus it will be seen that I have provided an efficient, relatively simple and inexpensive but extremely safe panel means for preventing the turning of window handles and door handles by children while riding in the rear seat of an automobile and serving as barriers for preventing the falling out of children should the door accidentally open while the car is moving; furthermore, I have provided a floor covering platform for providing a greater floor surface to enable children to play with safety on a rear seat without the danger of falling on the floor in case of sudden stoppage of the automobile as well as providing a large sleeping area, also which provides a separate lower compartment for storage of articles to prevent damage to articles on the floor or accidental tripping of children which would otherwise occur without such floor covering platform.

I claim:

1. In a vehicle having a front and rear seat, door posts therebetween, rear doors, and a rotatable window operating handle and a rotatable door operating handle mounted on each door, the combination of supplemental door safety panels wider than said doors, overling and positioned adjacent and parallel to the inner surface of said doors and having cut-out portions for closely surrounding said door operating handles and window operating handles, and stop elements on said safety panels adjacent said cut-out portions to act as stops for preventing turning of said handles, said panels being supported at their bottom edges on the floor of said vehicle, at their front edge between said door posts and front seat and at their rear edge between said body and side edges of the rear seat.

2. The combination recited in claim 1, together with a rear floor covering platform comprising two panels hinged together and having side edges adapted to be supported by said door safety panels, and having a support secured to said platform for supporting the hinged portion of the platform on the rear floor of the automobile, said platform being contoured to correspond to the perimeter of the rear seat and so as to fill the space between the front and rear seats so as to form a continuation of the surface of the rear seat to provide a large play and sleeping area as well as lateral support for said door safety panels.

References Cited in the file of this patent

UNITED STATES PATENTS

| | | |
|---|---|---|
| 1,062,898 | Drew | May 27, 1913 |
| 1,233,661 | Gordon | July 17, 1917 |
| 1,238,480 | Austin | Aug. 28, 1917 |
| 2,210,612 | Widman | Aug. 6, 1940 |